(12) United States Patent
Gubo

(10) Patent No.: US 7,599,513 B2
(45) Date of Patent: Oct. 6, 2009

(54) DEVICE FOR ENCODING AND MARKING OF DOCUMENTS FOR IDENTIFICATION AND RETRIEVAL

(75) Inventor: Adalbert Gubo, Frauenlobstrasse 55, Mainz (DE) D-55118

(73) Assignee: Adalbert Gubo, Mainz (DE)

( * ) Notice: Subject to any disclaimer, the term of this patent is extended or adjusted under 35 U.S.C. 154(b) by 756 days.

(21) Appl. No.: 10/908,053

(22) Filed: Apr. 26, 2005

(65) Prior Publication Data

US 2005/0238258 A1 Oct. 27, 2005

(30) Foreign Application Priority Data

Apr. 26, 2004 (EP) .................................. 04009792

(51) Int. Cl.
*G06K 9/00* (2006.01)
*G06K 9/54* (2006.01)
*G06K 1/00* (2006.01)

(52) U.S. Cl. ........................ 382/100; 382/306; 358/3.28

(58) Field of Classification Search ................. 382/100; 358/3.28; 380/52, 54, 270; 396/310; 283/72–75, 283/85, 93, 113, 901; 235/494; 713/165, 713/167, 176, 179

See application file for complete search history.

(56) References Cited

U.S. PATENT DOCUMENTS 5,467,447 A 11/1995 Vogel

| 6,369,904 | B1 | 4/2002 | Bhattacharjya et al. |
| 6,952,485 | B1* | 10/2005 | Davidson et al. ............ 382/100 |
| 6,970,573 | B2* | 11/2005 | Carr et al. .................... 382/100 |
| 7,246,239 | B2* | 7/2007 | Rodriguez et al. .......... 713/176 |
| 2002/0054356 | A1 | 5/2002 | Kurita et al. |
| 2003/0031340 | A1 | 2/2003 | Alattar et al. |

FOREIGN PATENT DOCUMENTS

| EP | 0838061 B1 | 7/1996 |
| WO | WO 01/74053 A1 | 10/2001 |
| WO | WO 02/10967 A2 | 2/2002 |

OTHER PUBLICATIONS

IBM, "Watermark data-hiding for print out by printer firmware", Research Disclosure, vol. 427, No. 96, Nov. 1999.

* cited by examiner

*Primary Examiner*—Yon Couso
(74) *Attorney, Agent, or Firm*—Husch Blackwell Sanders LLP

(57) ABSTRACT

A device which collects the pixel information generated during printing or scanning of a document, and transforms this sequential information into a code A which has a one-to-one relationship to the sequential pixel information, and which device computes from this code A a hashcode H which meets the requirements of a digital signature, and which device then feeds the digital information needed to print the hashcode H to the printer, in a pixel format, or feeds the same hashcode H to the digital media storage device, in both cases in a part of the document page which is digitally stored or printed, a method of use of the said device in encoding a document to form a hashcode H in pixel form.

8 Claims, 1 Drawing Sheet

Top Level Design Figure:
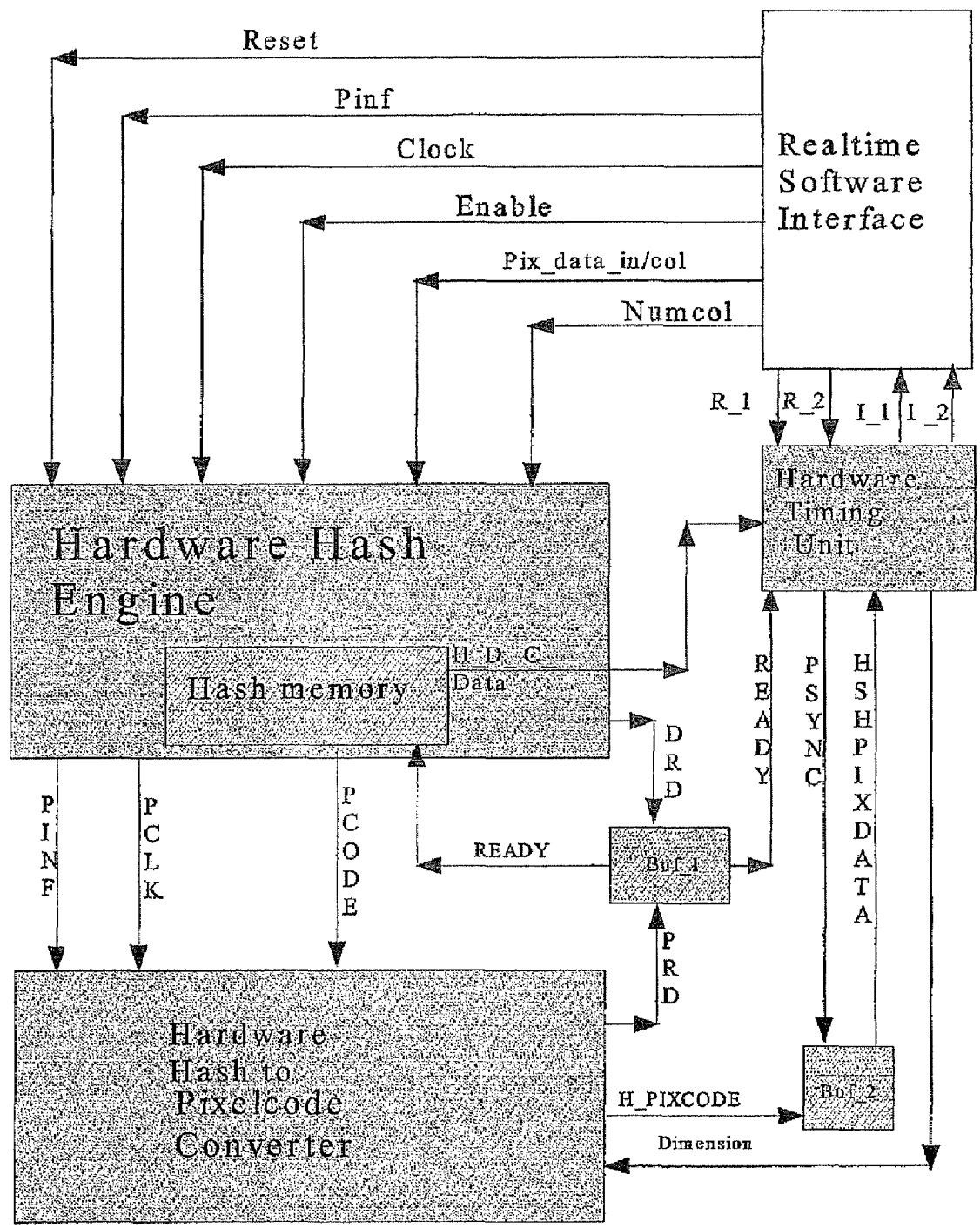

DEVICE FOR ENCODING AND MARKING OF DOCUMENTS FOR IDENTIFICATION AND RETRIEVAL

CROSS-REFERENCE TO RELATED APPLICATION

This patent application claims priority to European Patent Application No. 04009792.5, filed Apr. 26, 2004.

BACKGROUND OF INVENTION

Document retrieval is usually done physically, e.g. by marking documents in files according to their subject and time sequence. This is usually done in lists defined for retrieval purposes. These lists can only be made after collecting the corresponding information the documents are carrying. Retrieval of documents is usually done according to the information depending on the subject and time sequence in this lists. A name commonly used for such a list is called index.

More compact storage and retrieval is possible by storing the contents of paper files on microfilm, or in computer-readable form, on magnetic tapes, compact discs, digital versatile discs and the like.

It is also needed to provide an identical image of the document to be stored and retrieved, regardless of whether the said document is computer-generated, hand-written or other. This may be done by scanning a hand-written document or a hand-made drawing or a hand-signed document, or by collecting the pixel information during the printing of a document. A method for doing the latter is described in European Patent EP 0 838 061 B1.

In a computer-generated document, it is needed for retrieval purposes to provide a document with a means to identify the origin of a document and a way of distinguishing the original printout from a later printout. Such a "fingerprint" should be added to the document during the original printing process. This "fingerprint" is computed as a hashcode, which is comparable in its uniqueness with a DNA sequence of an individual living being.

It is not possible to retrieve the contents of the document from its hashcode, in the same way as it is not possible to reconstruct an individual living being from its DNA. But in both cases, the hashcode and the DNA are unique in their relationship to its basis, i.e. the document and the individual living being.

Because printing and scanning are dynamically ongoing processes which are never exactly the same in time, location and behaviour of the mechanical parts even if the data to scan or print are the same, their hashcodes are never the same even when the information of the document visible to the eye of the onlooker seems to be the same. To detect these differences, an extremely high sampling rate has to be used to monitor the dynamically ongoing process of printing and scanning on a realtime scale.

The present invention is directed to overcoming one or more of the problems set forth above.

SUMMARY OF INVENTION

This invention is directed to a device for encoding and marking of documents for identification and retrieval.

It is an aspect of the present invention to provide a device which encodes the information stored in a document starting from its pixel image, and to generate a code A therefrom which contains all the pixel information. The device according to this invention computes a hashcode H from this code A and the physical information B collected during the actual printing or scanning process from mechanical movement and electronic circuitry of the printer or scanning device according to a unique algorithm which meets the requirements of a digital signature, and adds this hashcode H to the code A thereby providing a combined code AH, on a page-by-page basis. The combined code AH is then stored on digital media and/or printed. This combined code represents the printed document image together with its hashcode found in bitmap form at the bottom of the current page.

The subject of the present invention is therefore a device which collects the pixel information generated during printing or scanning of a document, and transforms this sequential information into a code A which has a one-to-one relationship to the sequential pixel information, and which device computes from this code A and the physical information B collected during the actual printing or scanning process from mechanical movement and electronic circuitry of the printer or scanning device, a hashcode H which meets the requirements of a digital signature, and which device then feeds the digital information needed to print the hashcode H to the printer, in a pixel format, during the printing process of the page just being printed, or feeds the same hashcode H to the digital media storage device, in both cases in a part of the page, preferably the bottom part of the page, which is digitally stored and/or printed.

The algorithm used to generate the hashcode is such that the whole page, in other words, the whole code A is the basis for computation of the hashcode H. Additionally, information B collected during the printing or scanning process from the mechanical parts or the electronic circuitry, or both, of the printer or scanner is used together with code A as the basis for the generation of the hashcode H using a fast processor with a high sampling rate. The use of present-day fast digital processors makes it possible to generate the hashcode during the printing or scanning process in realtime, and to add this hashcode in an appropriate format, preferably a pixel format, to the last part of the page just printed, usually the bottom section of the said page.

The hashcode is machine-readable, and can be used to identify the document.

These are merely some of the innumerable aspects of the present invention and should not be deemed an all-inclusive listing of the innumerable aspects associated with the present invention. These and other aspects will become apparent to those skilled in the art in light of the following disclosure and accompanying drawing.

BRIEF DESCRIPTION OF DRAWINGS

For a better understanding of the present invention, reference may be made to the accompanying drawings in which:

FIG. 1 is a schematic of the main constituents of the device of the present invention including associated connection and interaction.

DETAILED DESCRIPTION OF THE INVENTION

According to the resolution of a printing or scanning device, a document is rastered into line and column information, in the case of a 1200×600 dpi resolution for a document of DIN A4 size this corresponds to approximately 70 million pixels in the case of a black and white print. This line and column information is then adapted to the printer used and serves as basis to generate e.g., the charge pattern in a drum of a laser printer.

The device of the present invention is a digital processor and consists of two main blocks, the first being the Hardware Hash Engine which computes a hashcode from the pixel sequence and the physical information from the printer or the scanner fed into it, in the case of the DIN A4 page referenced to above, from the combination of 70 million pixels found in the current document page. The other main block called "Hardware Hash to Pixelcode Converter" converts the hashcode calculated in the Hardware Hash Engine to a pixelcode which is added to the page information during printing or during storage. Computing of hashcode and conversion of the said hashcode to pixelcode are done in a realtime scale during the printing or storage of the document just processed.

A Hardware Timing Unit controls the flow of information pursuant to the resolution of the printed image, and the availability of the computed hashcode.

A first buffer is used to provide a signal to the Hash Memory to send the data generated from the Hardware Hash Engine pursuant to the ready status of the Hardware Timing Unit, to the Hardware Hash to Pixelcode Converter, and to provide a signal to the Hash Memory controller to send the next data packet once the conversion to pixelcode is complete. A second buffer uses intermediate hash code pixel data which are synchronised with the pixel sync signal to form hash code pixel data transmitted to the hardware timing unit which in turn passes on the raw hashcode data in pixel format to the Realtime Software Interface.

The connection and interaction of the main constituents of the device of the present invention is illustrated in detail in FIG. 1 which shows the Top Level Design.

Input Signals:
Reset Hardware Main Reset
Pinf Pixel Information
Clock Main Clock
Enable Hardware Enable
Pix_data_in/Col . . . Data/Color data
Numcol Number of Colors used
R_1 Request signal 1
R_2 Request signal 2
Dimension Dimension of Pixelcode according to the Image Resolution Output Signals:
I_1 Raw Hashcode Data
I_2 Raw Hashcode Data in Pixel Format
Ready Internal & External Ready Signal Internal Data Paths:
PINF Hashcode Depended Pixel Code Information
PCLK Internal Clock Signal
PCODE Intermediate Code Providing Hash Information
READY Internal & External Ready Signal
DRD Hash Digits Ready
PRD Pixel Bits Ready
PSYNC Pixel Sync Signal
HSHPIXDATA Hash Code Pixel Data
H_D_C_DATA Hashcode Digit Control Data
H_PIXCODE Intermediate Hash Code Pixel Data

What is claimed is:

1. A device which encodes and marks documents for identification and retrieval, which device collects sequential pixel information during scanning or during printing of a document, and which device further comprises:
    a conversion mechanism that transforms this sequential information into a code A which has a one-to-one relationship to the sequential pixel information; and
    a computational mechanism that computes from this code A and physical information B collected during the actual printing or scanning process from mechanical movement and electronic circuitry of a printer or scanning device, a hashcode H which meets the requirements of a digital signature, and
    a means which then feeds the digital information needed to print the hashcode H to the printer, in a pixel format as a part of a printed document page,
    wherein the device further includes at least two buffers which provide the signals for forwarding the computed hashcode H to a Hardware Hash to Pixelcode Converter, and for forwarding the hashcode pixel data via a Hardware Timing Unit to be incorporated into the document which is printed.

2. The device of claim 1 wherein the device further includes a Hardware Hash Engine which converts the sequential pixel information synchronized with line and column information of the printer or scanner to form a code A, and combines this code with physical information B collected during the actual printing or scanning process from mechanical movement and electronic circuitry of the printer or scanning device, to a hashcode H.

3. The device of claim 1, wherein the device further includes a Hardware Hash to Pixelcode Converter which converts the hashcode H to pixelcode which is printed or displayed at the end of the document page processed.

4. The device of claim 1 wherein the device further includes a Hardware Timing Unit which controls the Hardware Hash to Pixelcode Converter and releases the hash code pixel data to be incorporated into the document which is printed in interaction with a Realtime Software Interface.

5. A device which encodes and marks documents for identification and retrieval, which device collects sequential pixel information during scanning or during printing of a document, and which device further comprises:
    a conversion mechanism that transforms this sequential information into a code A which has a one-to-one relationship to the sequential pixel information; and
    a computational mechanism that computes from this code A and physical information B collected during the actual printing or scanning process from mechanical movement and electronic circuitry of a printer or scanning device, a hashcode H which meets the requirements of a digital signature, and
    a means which then feeds the hashcode H to a digital media storage device in a pixel format as a part of the digitally stored document, wherein the device further includes at least two buffers which provide the signals for forwarding the computed hashcode H to a Hardware Hash to Pixelcode Converter, and for forwarding the hashcode pixel data via a Hardware Timing Unit to be incorporated into the document which is digitally stored.

6. The device of claim 5 wherein the device further includes a Hardware Hash Engine which converts the sequential pixel information synchronized with line and column information of the printer or scanner to form a code A, and combines this code with physical information B collected during the actual printing or scanning process from mechanical movement and electronic circuitry of the printer or scanning device, to a hashcode H.

7. The device of claim 5, wherein the device further includes a Hardware Hash to Pixelcode Converter which converts the hashcode H to pixelcode which is printed or displayed at the end of the document page processed.

8. The device of claim 5 wherein the device further includes a Hardware Timing Unit which controls the Hardware Hash to Pixelcode Converter and releases the hash code pixel data to be incorporated into the document which is printed in interaction with a Realtime Software Interface.

* * * * *